United States Patent [19]
Bauer

[11] 3,811,725
[45] May 21, 1974

[54] LATCH AND ANTI-RATTLE CLIP

[75] Inventor: David J. Bauer, Taylor, Mich.

[73] Assignee: Ford Motor Company, Dearborn, Mich.

[22] Filed: June 29, 1973

[21] Appl. No.: 375,214

[52] U.S. Cl. ................................. 296/66, 292/76
[51] Int. Cl. ............................................ B60n 1/02
[58] Field of Search ............. 296/66, 69, 76, 70, 19; 49/394

[56] References Cited
UNITED STATES PATENTS

| | | | |
|---|---|---|---|
| 1,587,006 | 6/1926 | Ledwinka | 296/66 |
| 2,926,950 | 3/1960 | Hooverson | 296/66 |
| 3,053,565 | 9/1962 | Farrow | 296/66 |
| 3,291,512 | 12/1966 | Lewin | 292/70 |
| 3,466,075 | 9/1969 | Fernandex et al. | 292/76 X |

FOREIGN PATENTS OR APPLICATIONS

| | | | |
|---|---|---|---|
| 567,833 | 10/1957 | Italy | 292/70 |

Primary Examiner—Stanley H. Tollberg
Assistant Examiner—James M. Slattery
Attorney, Agent, or Firm—John J. Roethel; Keith L. Zerschling

[57] ABSTRACT

A combination latch and anti-rattle clip for a folding seat structure having a backrest panel pivotally mounted on the floor of a vehicle body. An elevated deck extends rearwardly of the floor and an upstanding wall extends from the floor to the deck. An extension panel is hinged to the backrest panel for pivotal movement with the latter from an upstanding position to a position in which the backrest panel, extension panel and elevated deck form a flat surface, the extension panel filling a space or gap between the backrest panel and elevated deck. The extension panel has a socket adjacent its edge opposite to its hinged edge.

The combination latch and anti-rattle clip comprises a high density elastomeric member having a flat base portion adapted to be mounted on the upstanding wall. A downwardly depending arcuate flange projects forwardly from the base portion intermediate the upper and lower edges of the latter. A terminal edge of the arcuate flange is in spaced relation to the bottom edge of the base portion. The arcuate flange is stiffly resiliently flexed toward the base portion upon engagement by the extension panel when the latter is folded against the backrest panel when both are in upstanding position thereby to provide the anti-rattle function.

At its upper edge the base portion is provided with an enlarged rib portion in spaced relation to the arcuate flange, the rib portion having on its rear edge a lip adapted to overlie the juncture of the upstanding wall and the elevated deck. The enlarged rib is receivable in the extension panel socket to latch the latter in planar relationship to the deck when the extension panel is in horizontal position between the backrest panel and elevated deck.

4 Claims, 3 Drawing Figures

PATENTED MAY 21 1974　　　　　　　　　　　　3,811,725

LATCH AND ANTI-RATTLE CLIP

BACKGROUND OF THE INVENTION

U.S. Pat. No. 2,926,950 issued Mar. 1, 1960 to C. P. Hooverson for a "Vehicle Seat" discloses a conventional arrangement for a folding seat construction utilized in a station wagon type vehicle. The vehicle has a floor, an elevated deck extending rearwardly of the floor and an upstanding wall connecting the floor and deck. The foldable seat comprises a seat cushion supported on the floor and a backrest mounted on a hinged structure and adapted to be folded forwardly over the seat cushion. The back surface of the backrest panel to which the backrest cushion is attached is adapted to provide a cargo-carrying floor surface when the back panel is in a horizontal position substantially in coplanar alignment with the surface of the elevated deck. When the backrest is folded forwardly, this leaves a gap between its panel and the elevated deck which gap is usually filled by a hinged extension panel. This extension panel is pivotally connected to the backrest panel at the respective lower edges of the two when they are in an upstanding position.

It is desirable that an anti-rattle device be provided to keep the extension panel from rattling against the backrest panel when the two are in an upstanding position. It is further desirable to provide a latching device to latch the free edge of the extension panel to the adjacent edge of the elevated deck when the backrest panel and extension panel form a horizontal extension of the elevated deck.

It is an object of the present invention to provide a simple elastomeric device adapted to function both as a latch and anti-rattle clip.

SUMMARY OF THE INVENTION

The present invention relates to a combination latch and anti-rattle clip for a folding seat structure mounted in a vehicle. The vehicle is of the type having a floor, an elevated deck to the rear of the floor and an upstanding wall extending from the floor to the deck. The folding seat structure is of the type having a backrest panel pivotally supported on the floor for movement from an upright position to a substantially horizontal position in spaced alignment with the elvated deck. An extension panel is hinged along one edge to the backrest panel for pivotal movement from a folded position against the backrest panel when the latter is in an upstanding position to a substantially horizontal position filling the space or gap between the elevated deck and the backrest panel in horizontal position of the latter. The extension panel is provided with a socket adjacent the edge thereof opposite its hinged edge.

The combination latch and anti-rattle clip comprises a high density elastomeric member having a flat base portion adapted to be mounted on the upstanding wall between the floor and deck. The elastomeric member has a downwardly depending arcuate flange projected forwardly from the base portion intermediate the upper and lower edges of the latter with its terminal edge in spaced relation to the bottom edge of the base portion. The arcuate flange is stiffly resilient for flexing toward the base portion upon engagement by the extension panel when the latter is folded against the backrest panel when both are in upstanding position, thereby to provide an anti-rattle function.

The base portion has at its upper edge an enlarged rib portion in spaced relation to the arcuate flange. The rib portion has on its rear edge a lip adapted to overlie the juncture of the upstanding wall and the elevated deck. The enlarged rib is receivable in the extension panel socket to latch the latter in planar relationship to the deck when the extension panel is in horizontal position between the backrest panel and the elevated deck.

DESCRIPTION OF THE DRAWING

Further features and advantages of the present invention will be made more apparent as this description proceeds, reference being had to the accompanying drawing, wherein.

DETAILED DESCRIPTION OF THE INVENTION

Figure 1:
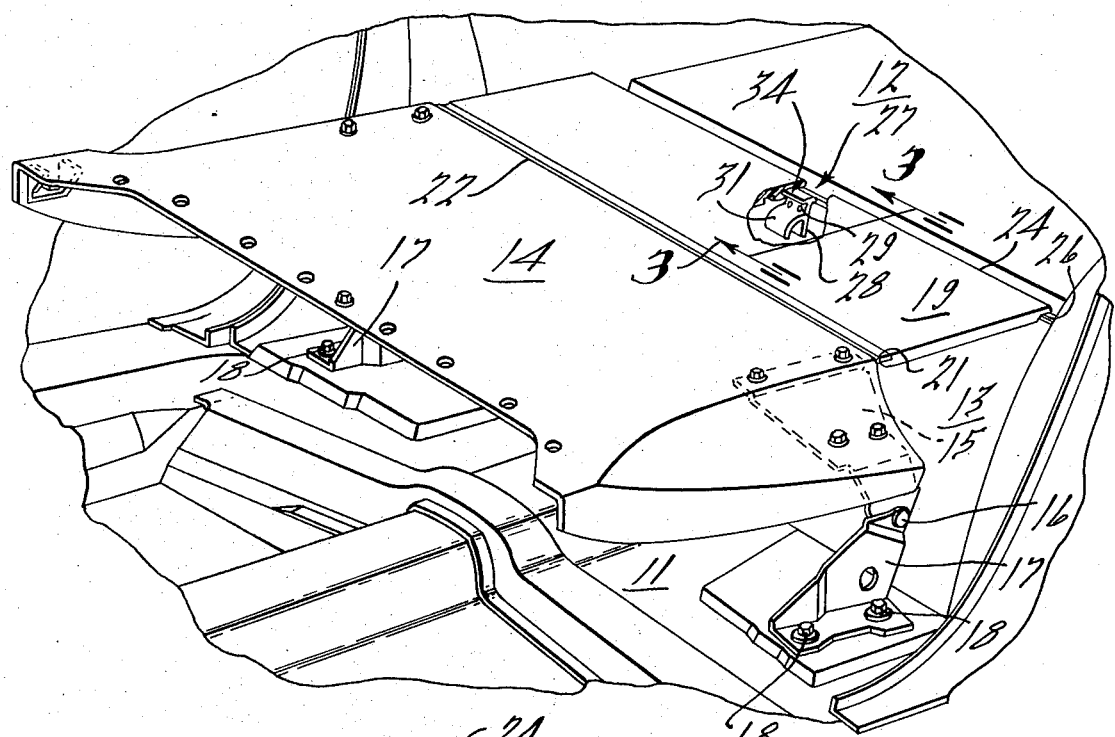
FIG. 1 is a fragmentary perspective view of a portion of a vehicle body having a foldable seat mounted therein and in particular illustrating a seat backrest structure and extension panel in a horizontal position relative to an elevated deck and disclosing in relation thereto the combination latch and clip device embodying the present invention.

FIG. 1 illustrates a section of a typical vehicle body of the station wagon type. There is shown a vehicle floor 11, an elevated deck 12 to the rear of the floor, and an upstanding slightly inclined wall 13 connecting the floor 11 to the elevated deck 12.

To provide for increased cargo-carrying area, most station wagon type vehicles have foldable rear seat structures. These structures may comprise a seat cushion fixed to the vehicle floor and a backrest forwardly pivotal over the seat cushion with the seat back panel being adapted to form a continuation of the elevated deck when the panel is in a horizontal position. To cover the space or gap between the horizontal back panel and the elevated deck, an extension panel is hinged to the lower edge of the back panel, the extension panel being swingable into abutting relation to a supporting lip on the front edge of the elevated deck.

Figure 2:
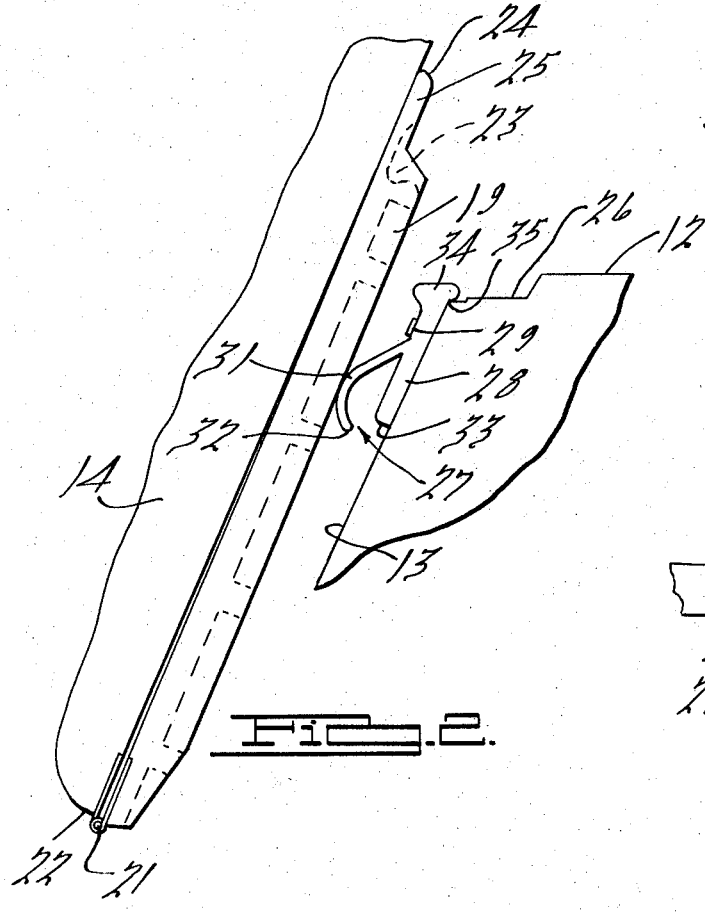
FIG. 2 is a fragmentary side elevation showing the vehicle seat backrest panel and extension panel in folded upstanding condition and the relationship of the combination latch and clip device to these panels in such condition.

Referring now to FIG. 1, there is shown a backrest panel 14 which is supported on arms 15 pivotally connected at 16 to support stanchions 17 held by bolts 18 to the vehicle floor 11. An extension panel 19 is connected by a piano hinge 21 to the edge 22 of the back panel 14, the edge 22 being the lower edge of the back panel when the latter is in a substantially upright position as shown in FIG. 2.

The extension panel 19 has a socket 23 adjacent its edge 24. The socket 23 is located substantially in the center of the extension panel 19 and is elongated in a direction parallel to the edge 24 of the panel. It will be noted that the extension panel is undercut forwardly of its edge 24 to provide a stepped portion 25 adapted to overlie a step 26 in the forward edge of the elevated deck 12.

Generally, a latch means (not shown) is provided to latch the backrest panel, such as the panel 14, in an upright position. Usually no direct provision is made, however, for holding an extension panel, such as the panel 19, against the backrest panel to prevent rattling on rough roads. Also, generally, provision is made for a spring clip to hold the free edge of the extension panel on the edge of an elevated deck. These spring clips are subject to looseness and usually involve metal-to-metal contact able to produce further rattling sounds.

Embodied in the present invention is a combined elastomeric latch and anti-rattle clip, generally designated 27. The combined latch and anti-rattle clip 27 preferably is a high density polyethylene extrusion. It has a substantially rectangular elongated base portion 28 adapted to be mounted on the wall 13 of the vehicle by suitable fasteners, such as screws 29.

A downwardly depending arcuate flange 31 projects forwardly from the base portion 28 intermediate the upper and lower edges of the latter, the terminal edge 32 being in spaced relationship to the lower edge 33 of the base portion.

The arcuate flange 32 is stiffly resilient. When flexed toward the base portion 28 upon being engaged by the underside of the extension panel 19 when the latter is folded against the backrest panel 14, the arcuate flange causes the extension panel 19 to be held firmly against the backrest panel 14 against rattling caused by most road vibrations likely to be picked up by the vehicle body. FIG. 2 illustrates the flexed arcuate flange in abutting relation to the underside of the extension panel 19 when the latter is folded against the backrest panel 14 when both are in the upstanding position in passenger-carrying position.

Figure 3:
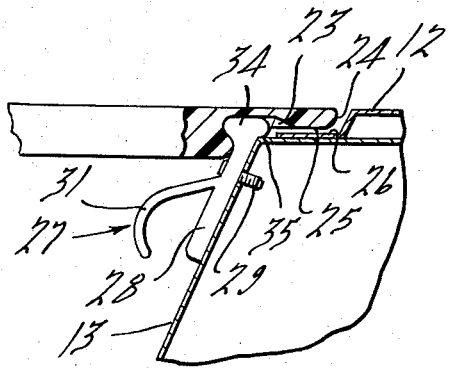
FIG. 3 is an enlarged sectional view on the line 3—3 of FIG. 1.

Along its upper edge the base portion 28 has a longitudinally extending enlarged rib 34 having on its rear edge a lip 35 adapted to overlie the juncture of the upstanding wall 13 and the step 26 of the elevated deck 12. The enlarged rib 34 is receivable in the socket 23 of the extension panel 19 to latch the latter in planar relationship to the deck 12 when the extension panel 19 is in horizontal position between the backrest panel 14 and deck 12. The rib 34 on the base portion 28 is shaped and placed so that when engaged with the socket 23 it is compressed slightly and flexed lightly toward the rear, i.e., toward the deck 12, ensuring that the latching function will not become disengaged by virture of the panel vibrating out of latching engagement with the rib portion 34 on the combined latch and anti-rattle clip device. As best seen in FIG. 3, when the rib portion is received in the socket, it and the base portion between the rib portion 34 and the arcuate flange 31 are interposed between and maintain the panel extension 19 in noncontact relationship to adjacent surfaces of the upstanding wall 13 and the elevated deck 12.

It is to be understood that this invention is not limited to the exact construction illustrated and described above, but that various changes and modifications may be made without departing from the spirit and scope of the invention as defined by the following claims:

I claim:

1. A combination latch and anti-rattle clip for a folding seat structure mounted in a vehicle, .

the vehicle having a floor, an elevated deck to the rear of the floor, and an upstanding wall extending from the floor to the deck, the folding seat structure having a backrest panel pivotally supported on the floor for movement from an upright position to a substantially horizontal position in spaced alignment with the elevated deck, and an extension panel hinged along one edge to the backrest panel for pivotal movement from a folded position against the backrest panel, when the latter is in an upstanding position, to a substantially horizontal position filling the space between the elevated deck and the backrest panel in horizontal position of the latter, the extension panel having a socket adjacent the edge thereof opposite its hinged edge, combination latch and anti-rattle clip comprising:

a high density elastomeric member having a flat base portion adapted to be mounted on the upstanding wall between the floor and deck, a downwardly depending arcuate flange projecting forwardly from the base portion intermediate the upper and lower edges of the latter with its terminal edge in spaced relation to the bottom edge of the base portion, the arcuate flange being stiffly resilient for flexure toward the base portion upon engagement by the extension panel when the latter is folded against the backrest panel when both are in upstanding position thereby to provide an anti-rattle function, and an enlarged rib portion at the upper edge of the base portion in spaced relation to the arcuate flange, the rib portion having on its rear edge a lip adapted to overlie the juncture of the upstanding wall and the elevated deck, the enlarged rib being receivable in the extension panel socket to latch the latter in planar relationship to the deck when the extension panel is in horizontal position between the backrest panel and deck.

2. A combination latch and anti-rattle clip according to claim 1, in which:

the arcuate flange and the enlarged rib portion are elongated in the direction of the edge of the panel adjacent the socket with the rib portion being substantially complementary in length to the length of the socket.

3. A combination latch and anti-rattle clip according to claim 1, in which:

when the rib portion is received in the socket, it and the base portion between the rib portion and arcuate flange are interposed between and maintain the panel extension in non-contact relationship to the adjacent surfaces of the upstanding wall and elevated deck.

4. A combination latch and anti-rattle clip according to claim 1, in which:

the elastomeric material is high density polyethylene.

* * * * *